(12) United States Patent
Abusleme et al.

(10) Patent No.: US 10,428,211 B2
(45) Date of Patent: Oct. 1, 2019

(54) FLUOROPOLYMER COMPOSITION FOR MOBILE ELECTRONIC DEVICE

(71) Applicant: SOLVAY SPECIALTY POLYMERS ITALY S.P.A., Bollate (IT)

(72) Inventors: Julio A. Abusleme, Saronno (IT); Ségolène Brusseau, Tavaux (FR); Geert J. Verfaillie, Parike (BE); Giulio Brinati, Milan (IT)

(73) Assignee: SOLVAY SPECIALTY POLYMERS ITALY S.P.A., Bollate (MI) (IT)

( * ) Notice: Subject to any disclaimer, the term of this patent is extended or adjusted under 35 U.S.C. 154(b) by 52 days.

(21) Appl. No.: 15/749,378

(22) PCT Filed: Jul. 26, 2016

(86) PCT No.: PCT/EP2016/067757
§ 371 (c)(1),
(2) Date: Jan. 31, 2018

(87) PCT Pub. No.: WO2017/021207
PCT Pub. Date: Feb. 9, 2017

(65) Prior Publication Data
US 2018/0223090 A1    Aug. 9, 2018

(30) Foreign Application Priority Data

Jul. 31, 2015 (EP) .................................. 15179220

(51) Int. Cl.
| | | |
|---|---|---|
| *C08L 27/16* | (2006.01) | |
| *C08L 27/20* | (2006.01) | |
| *C08L 23/06* | (2006.01) | |
| *C08K 3/26* | (2006.01) | |
| *C08K 5/101* | (2006.01) | |
| *C08K 5/20* | (2006.01) | |
| *C08L 23/08* | (2006.01) | |

(52) U.S. Cl.
CPC ................ *C08L 27/16* (2013.01); *C08K 3/26* (2013.01); *C08K 5/101* (2013.01); *C08K 5/20* (2013.01); *C08L 23/06* (2013.01); *C08K 2003/265* (2013.01); *C08L 23/0815* (2013.01); *C08L 27/20* (2013.01); *C08L 2205/02* (2013.01); *C08L 2205/025* (2013.01); *C08L 2205/03* (2013.01); *C08L 2207/062* (2013.01)

(58) Field of Classification Search
None
See application file for complete search history.

(56) References Cited

U.S. PATENT DOCUMENTS

| | | | | |
|---|---|---|---|---|
| 5,106,911 | A  * | 4/1992 | Chapman, Jr. ...... | C08L 23/0815 264/169 |
| 6,743,865 | B2 * | 6/2004 | Mekhilef ................ | C08L 27/16 525/199 |
| 2016/0200907 | A1* | 7/2016 | Amin-Sanayei ........... | C08J 5/18 428/36.9 |

FOREIGN PATENT DOCUMENTS

| | | |
|---|---|---|
| WO | 2014/195226 A1 | 12/2014 |
| WO | 2015/031569 A1 | 3/2015 |

OTHER PUBLICATIONS

Standard ASTM D1238-04, "Standard Test Method for Melt Flow Rates of Thermoplastics by Extrusion Plastometer", copyright ASTM International, 2004, pp. 1-13.
Standard ASTM D3418-08 "Standard Test Method for Transition Temperatures and Enthalpies of Fusion and Crystallization of Polymers by Differential Scanning Calorimetry", Copyright ASTM International, 2008, 7 pages.

* cited by examiner

*Primary Examiner* — Richard A Huhn

(57) ABSTRACT

The invention pertains to a fluoropolymer composition including at least a vinylidene fluoride (VDF) homopolymer, a VDF semi-crystalline copolymer, and a polyethylene additive, which is suitable for the manufacture of parts of mobile electronic devices, to a method for the manufacture of said parts, and to a method of manufacturing a mobile electronic device using said parts.

20 Claims, No Drawings

FLUOROPOLYMER COMPOSITION FOR MOBILE ELECTRONIC DEVICE

CROSS-REFERENCE TO RELATED APPLICATION

This application is a U.S. national stage entry under 35 U.S.C. § 371 of International Application No. PCT/EP2016/067757 filed Jul. 26, 2016, which claims priority to European application No. 15179220.7 filed on Jul. 31, 2015. The entire contents of these applications are explicitly incorporated herein by this reference.

TECHNICAL FIELD

The invention pertains to a fluoropolymer composition, to a mobile electronic device comprising at least one part made of said fluoropolymer composition, to a method for the manufacture of said part, and to a method of manufacturing a mobile electronic device using said part.

BACKGROUND ART

Nowadays, mobile electronic devices such as mobile phones, personal digital assistants (PDAs), laptop computers, MP3 players, and so on, are in widespread use around the world. Mobile electronic devices are getting smaller and lighter for even more portability and convenience, while at the same time becoming increasingly capable of performing more advanced functions and services, both due to the development of the devices and the network systems.

While for convenience sake, it is often desirable that these devices be small and lightweight, they still need to possess a certain structural strength so that they will not be damaged in normal handling and occasional drops. Thus, usually built into such devices are structural parts whose primary function is to provide strength and/or rigidity and/or impact resistance to the device, and possibly also provide mounting places for various internal components of the device and/or part or all of the mobile electronic device case (outer housing), while ensuring electrical insulation/electrical shield among components. While in the past, low density metals such as magnesium or aluminium, were the materials of choice, synthetic resins have progressively come as at least partial replacement, for costs reasons (some of these less dense metals such as magnesium are somewhat expensive, and manufacturing the often small and/or intricate parts needed is expensive), for overriding design flexibility limitations, for further weight reduction, and for providing un-restricted aesthetic possibilities, thanks to the colorability of the same. Plastic parts of such devices are hence made from materials that are easy to process into various and complex shapes, are able to withstand the rigors of frequent use, including outstanding impact resistance, generally possess electrical insulating capabilities, and which can meet challenging aesthetic demands while not interfering with their intended operability.

Nevertheless, in certain cases, plastics may not have the strength and/or stiffness to provide for all-plastic structural parts in mobile electronic devices, and metal/synthetic resins assemblies are often encountered.

In these cases, metal parts, e.g. aluminum parts and/or aluminium/plastic composite parts present in mobile devices, are submitted generally to anodization, i.e. to electro chemical processes where the aim is to build an oxide layer on the aluminum surface, notably through the use of aggressive chemicals. In this regards, anodization being performed on parts already comprising/assembled to polymeric elements, polymeric materials used are required to exhibit excellent chemical resistance to various aggressive acids.

As said, it is desirable that such plastic materials for mobile devices have good impact resistance, tensile strength, stiffness and that they exhibit minimal warpage when they are formed (as by injection molding, for example) into the intended complex shape, designed to be assembled with minimum tolerance with a large number of additional structural and functional components.

The warpage is a term designating dimensional distortion in the molded parts leading to their concave or convex curvature. An inherent shrinkage occurs during any injection molding process because the density of the polymer varies from the processing temperature to the ambient temperature. During injection molding, the variation in shrinkage creates internal stresses which lead to the warpage of the part upon ejection from the mold. If the shrinkage throughout the part is uniform, the molded part will not deform or warp, it will simply become smaller. However, providing polymer materials delivering uniform shrinkage remains a challenge.

An additional requirement for plastics material used in mobile electronics part is that they shall be resistant to staining agents that are often put in contact with these portable electronic devices housings. Typical staining agents include: makeup (such as lipstick, lip gloss, lip liner, lip plumper, lip balm, foundation, powder, blush), artificial or natural colorants (such as those found in soft drinks, coffee, red wine, mustard, ketchup and tomato sauce), dyes and pigments (such as those found in dyed textiles and leather, used for the manufacture of portable electronic devices housings). In contact with these staining agents, the portable electronic devices housings maybe easily stained: anti-stain properties are hence much appreciated for maintaining aesthetic appearance of said portable devices, in particular when the same are bright coloured or in shades of white or clear colours.

Providing a polymeric composition fulfilling all aforementioned requirements, that is to say possessing adequate mechanical performances for ensuring structural support (tensile strength) and yet a certain flexibility for enabling mounting/assembling (elongation at break), able to withstand to impact and to aggressive chemicals, having colorability and stain and UV-resistance is a continuous challenge in this field, and while solutions based on a variety of plastics have already been attempted, still continuous improvements to reach unmet challenges are required.

SUMMARY OF INVENTION

Within this frame, the present invention aims at providing a solution based on the use of a particular composition based on fluorinated polymers.

More specifically, the invention is directed, in a first aspect, to a fluoropolymer composition [composition (C)], said composition comprising:

at least one vinylidene fluoride (VDF) homopolymer [PVDF] in an amount of from 55 to 85% wt, said PVDF possessing a first molecular weight (M PVDF);

at least one VDF semi-crystalline copolymer comprising recurring units derived from VDF and recurring units derived from HFP [VDF copolymer] in an amount of from 15 to 45% wt, said VDF copolymer possessing a second molecular weight ($M_{VDF\ copolymer}$) such that $M_{VDF\ copolymer}$ is higher than $M_{PVDF}$;

the % wt being referred to the sum of weights of PVDF and VDF copolymer, and at least one high density ethylene polymer [polymer (PE)], comprising more than 70% weight of recurring units derived from ethylene, and possibly comprising recurring units derived from at least one alpha-olefin different from ethylene, said polymer (PE) possessing a density of from 930 to 970 kg/m$^3$, said polymer (PE) being comprised in an amount of at least 0.05 weight parts and at most 5 weight parts, per 100 weight parts of combined amount of PVDF and VDF copolymer.

In another aspect, the invention provides for a mobile electronic device comprising at least one part made of a fluoropolymer composition [composition (C)], as above detailed.

A further object of the present invention is a method for manufacturing a part of a mobile electronic device, said method comprising:

(i) providing a composition (C), as above detailed; and (ii) moulding said composition (C) so as to provide said part.

Still another object of the invention is the manufacture of a mobile electronic device, said method including the steps of:

a. providing as components at least a circuit board, a screen and a battery;

b. providing at least one part made of the composition (C), as above detailed; and c. assembling at least one of said components with said part or mounting at least one of said components on said part.

The Applicant has surprisingly found that compositions (C), as above detailed, thanks to the combination of the PVDF homopolymer of lower molecular weight, the VDF copolymer of higher molecular weight, and the limited amount of high density PE additive, are delivering a particularly advantageous combinations of properties which make them particularly adapted for the manufacture of parts of mobile electronic devices. In particular parts of mobile electronic devices made from said composition (C) possess superior chemical resistance, excellent UV resistance and good mechanical properties, and simultaneously have outstanding impact resistance, low warpage, and excellent colorability (easy dispersion of pigments).

DESCRIPTION OF EMBODIMENTS

The PVDF

The expression vinylidene fluoride homopolymer and PVDF are used within the frame of the present invention for designating polymers essentially made of recurring units derived from vinylidene fluoride (VDF).

Defects, end chains, impurities, chains inversions or branchings and the like may be additionally present in the PVDF in addition to the said recurring units derived from VDF, without these components substantially modifying the behaviour and properties of the PVDF.

The PVDF is selected so as to possess a lower molecular weight than the VDF copolymer, that is to say to ensure that $M_{VDF\ copolymer}$ is higher than $M_{PVDF}$. Selecting the PVDF and the VDF copolymer in this manner enables, at given overall averaged molecular weight of the blend, achieving better impact resistance properties: without being bound by this theory, the Applicant thinks that the contribution brought by a higher molecular weight to the impact resistance is substantially more significant when long chains are chains of a VDF copolymer than long chains of a homopolymer.

The expression 'molecular weight', when associated to PVDF and VDF copolymer, is intended to denote the average molecular weight of the said polymers, Measured by any possible appropriate technique, enabling comparison between the molecular weight of PVDF polymer and molecular weight of VDF copolymer.

The manner of determining molecular weight is hence not critical, provided that the said determination can be equally applied to both the PVDF and the VDF copolymer to enable a meaningful comparison.

Molecular weight can be e.g. determined with reference to melt flow rate (MFR) determination according to ASTM D 1238. In this case, the condition requiring $M_{VDF\ copolymer}$ being higher than $M_{PVDF}$ is to be interpreted as requiring that the MFR of PVDF ($MFR_{PVDF}$) measured under a certain piston load and a certain temperature, is higher than the MFR of the VDF copolymer ($MFR_{VDF\ copolymer}$), when measured under identical conditions.

Molecular weight can be equally e.g. determined by inherent viscosity measurements, notably from a 4.0 g/l solution in N,N-dimethylformamide stabilized with 0.1 M of LiBr, at a temperature of 25° C., for instance using a Ubbelohde viscosimeter type B.

Inherent viscosity ($\eta_i$) is defined as:

$$\eta_i = \frac{1}{c}\ln\left(\frac{\eta_c}{\eta_0}\right)$$

wherein c is the concentration of the polymer in solution; $\eta_c$ is the viscosity of the solution at concentration c, and $\eta_0$ is the viscosity of the solvent used for the preparation of said solution.

In this case, the condition requiring $M_{VDF\ copolymer}$ being higher than $M_{PVDF}$ is to be interpreted as requiring that the $\eta_i$ of PVDF ($\eta_{i\ PVDF}$) is lower than the $\eta_i$ of the VDF copolymer ($\eta_{i\ VDF\ copolymer}$), when measured under identical conditions.

The PVDF generally possesses a relatively low/medium molecular weight, corresponding generally to a melt flow rate (230° C./5 kg, according to ASTM D 1238) of at least 5 g/10 min. Upper limit for MFR will be of at most 50 g/10 min, preferably of at most 30 g/10 min, even more preferably at most 15 g/10 min.

The PVDF generally possesses an inherent viscosity ($\eta_{i\ PVDF}$), measured as above detailed, of less than 1.5 dl/g, preferably less than 1.3 dl/g, more preferably less than 1.2 dl/g. Lower limit for $\eta_{i\ PVDF}$ will be of at least 0.5 dl/g, preferably of at least 0.7 dl/g, more preferably of least 0.8 dl/g.

The VDF Semi-Crystalline Copolymer

The expression VDF copolymer are used within the frame of the present invention for designating polymers comprising recurring units derived from vinylidene fluoride (VDF), and a substantial amount of recurring units derived from HFP.

The VDF copolymer used within the frame of the present invention is semi-crystalline. The term semi-crystalline is intended to denote a polymer which possesses a detectable melting point. It is generally understood that a semi-crystalline VDF copolymer possesses a heat of fusion, determined according to ASTM D 3418, of advantageously at least 1 J/g.

Semi-crystalline VDF copolymers useful in composition (C) preferably possess a heat of fusion of at least 5 J/g, more preferably of at least 10 J/g, even more preferably at least 15 J/g.

Excellent results were obtained when VDF copolymer had a heat of fusion of at least 30 J/g, preferably at least 35 J/g.

The VDF copolymer is preferably a polymer comprising:
(a') at least 75% by moles, preferably at least 85% by moles of recurring units derived from vinylidene fluoride (VDF);
(b') from 1 to 25%, preferably from 2 to 15%, more preferably from 3 to 12% by moles of recurring units derived from HFP; and
(c') optionally from 0.1 to 5%, by moles, preferably 0.1 to 3% by moles, more preferably 0.1 to 1% by moles of recurring units derived from one or more additional comonomer(s) different from VDF and HFP, all the aforementioned % by moles being referred to the total moles of recurring units of the VDF copolymer.

The said optional additional comonomer(s) different from VDF and HFP is generally a fluorinated monomer, which can be advantageously selected in the group consisting of vinyl fluoride ($VF_1$); trifluoroethylene ($VF_3$); chlorotrifluoroethylene (CTFE); 1,2-difluoroethylene; tetrafluoroethylene (TFE); perfluoro(alkyl)vinyl ethers, such as perfluoro (methyl)vinyl ether (PMVE), perfluoro(ethyl) vinyl ether (PEVE) and perfluoro(propyl)vinyl ether (PPVE); perfluoro (1,3-dioxole); perfluoro(2,2-dimethyl-1,3-dioxole) (PDD). Chlorine-free fluorinated monomers are preferred. More preferably, the possible additional fluorinated comonomer is chosen from trifluoroethylene (VF3) and tetrafluoroethylene (TFE).

The said additional comonomer(s) may be also free from fluorine, and more generally free from halogens, in which case it will be designated as a hydrogenated monomer. The choice of the said hydrogenated comonomer(s) is not particularly limited; alpha-olefins, (meth)acrylic monomers (including (meth)acrylic acids and (meth)acrylates comprising hydroxyl-substituted alkyl groups), vinyl ether monomers, styrenic monomers may be used; nevertheless, to the sake of optimizing chemical resistance, embodiment's wherein the VDF copolymer is essentially free from recurring units derived from said hydrogenated comonomer(s) are preferred.

It is generally understood that parts of mobile electronic devices made from polymer materials which are free from organic bound chlorine, like VDF copolymers of the present invention, are more advantageous as these materials are not generating HCl nor any chlorine-containing compounds under any condition, which may generate corrosion e.g. in metal components/junctions and/or evolve toxic gases in case of combustion.

Still, it is generally preferred for the VDF copolymer to be substantially free from recurring units derived from any additional comonomers different from VDF and HFP.

Accordingly, the VDF copolymer is more preferably a polymer consisting essentially of:
(a') at least 75% by moles, more preferably 85% by moles of recurring units derived from vinylidene fluoride (VDF);
(b') from 1 to 25%, preferably from 2 to 15%, more preferably from 3 to 12% by moles of recurring units derived from hexafluoropropene (HFP), all the aforementioned % by moles being referred to the total moles of recurring units of the VDF copolymer.

Defects, end chains, impurities, chains inversions or branching's and the like may be additionally present in the VDF copolymer in addition to the said recurring units, without these components substantially modifying the behaviour and properties of the VDF copolymer.

It is generally preferred for the recurring units derived from HFP to be distributed in the polymer chains of the VDF copolymer in a heterogeneous manner, i.e. providing for sequences rich in HFP, in combination with sequences quasi exempt from the said HFP, i.e. being quasi-homopolymer sequences.

This heterogenous distribution of the VDF and HFP enables achieving in the VDF copolymer a peculiar microstructure comprising crystalline domains, providing for high melting points, in combination with more "soft" domains.

The VDF copolymer has a melting point ($T_{m2}$) of advantageously at least 120° C., preferably at least 125° C., more preferably at least 130° C. and of at most 180° C., preferably at most 175° C., more preferably at most 170° C., when determined by DSC, at a heating rate of 10° C./min, according to ASTM D 3418.

As explained above, the VDF copolymer is selected to possess a higher molecular weight than the PVDF. In this case, a VDF copolymer having relatively high molecular weight, corresponding generally to a melt flow rate (230° C./21.6 kg, according to ASTM D 1238) of less than less than 25 g/10 min is advantageously selected.

Accordingly, it is advantageous for the VDF copolymer to possess a melt flow rate (at 230° C./21.6 kg, ASTM D1238) of about 0.1 to 20 g/10 min, preferably of about 0.5 to 15 g/10 min, more preferably of about 0.5 to 10 g/10 min.

The VDF copolymer generally possesses an inherent viscosity ($\eta_{i\ VDF\ copolymer}$), measured as above detailed, of at least 1.2 dl/g, preferably of at least 1.3 dl/g, more preferably of at least 1.4 dl/g, even more preferably of at least 1.5 dl/g. Upper limit for $\eta_{i\ VDF\ copolymer}$ will be of at most 3.5 dl/g, preferably of at most 3.0 dl/g, more preferably of most 2.5 dl/g.

The Polymer (PE)

As said, composition (C) comprises one high density ethylene polymer [polymer (PE)], comprising more than 70% weight of recurring units derived from ethylene, and possibly comprising recurring units derived from at least one alpha-olefin different from ethylene.

The choice of said alpha-olefin different from ethylene is not particularly critical; it will be nevertheless preferably selected from the group consisting of 1-butene, 1-hexene, 1-octene.

Said polymer (PE) possesses a density of from 930 to 970 kg/m$^3$, which provides for a relatively highly crystalline material, possessing an opacifying behaviour in the composition (C).

While not being bound by this theory, the Applicant is of the opinion that the addition of this peculiar polymer (PE) is particularly advantageous to obtain a material which is opaque and which can be easily coloured through the addition of suitable pigments, leading to brilliant and bright but not translucent coloured parts, simultaneously improving impact resistance properties and processability of the PVDF/VDF copolymer blend without impairing all other advantageous properties of the blend.

As explained, said polymer (PE) is comprised in the composition (C) in an amount of at least 0.05, preferably at least 0.10, even preferably at least 0.15 weight parts and at most 5, preferably at most 3, more preferably at most 1 weight parts, per 100 weight parts of combined amount of PVDF and VDF copolymer.

The Composition (C)

The amount of PVDF in the composition (C) is of at least 55% wt, preferably at least 58% wt, even more preferably of at least 60% wt; and/or is of at most 85% wt, preferably at most 80% wt, most preferably at most 75% wt, with respect to the total weight of PVDF and VDF copolymer.

The amount of VDF copolymer in the composition (C) is of at least 15% wt, preferably of at least 20% wt; and/or is of at most 45% wt, preferably at most 43% wt, even more preferably at most 40% wt, with respect to the total weight of PVDF and VDF copolymer.

Compositions comprising from 60 to 65% wt of PVDF and from 40 to 35% wt of VDF copolymer, with respect to the total weight of PVDF and VDF copolymer, have been found particularly advantageous within the frame of the present invention.

The composition (C) may further comprise, in addition to PVDF, VDF copolymer, and polymer (PE), one or more additives, notably one or more additives selected from the group consisting of pigments, processing aids, plasticizers, stabilizers, mould release agents, acid scavengers, antioxidants, and the like.

When present, additives are generally comprised in the composition (C) in amounts not exceeding 10 parts per 100 weight parts of combined weight of PVDF and VDF copolymer.

Generally, the composition (C) consists of PVDF, VDF copolymer, polymer (PE), and possibly said one or more additives, in the afore-mentioned amounts.

As acid scavengers, mention can be notably made of calcium carbonate, in particular a calcium carbonate commercially available as SOCAL® 312 PCC from Solvay.

As antioxidant, mention can be notably made of tetrakis[methylene-3-(3,5-di-tert-butyl-4-hydroxyphenyl)propionate]methane, notably commercially available as Songnox® 1010 antioxidant, octadecyl-3,5-Di(tert)-butyl-4-hydroxyhydrocinnmate, notably commercially available as IRGANOX® 1076 antioxidant, N,N'-hexane-1,6-diylbis(3-(3,5-di-tert-butyl-4-hydroxyphenylpropionamide)), notably commercially available as IRGANOX® 1098 antioxidant, triethylene glycol bis(3-tert-butyl-4-hydroxy-5-methylphenyl)propionate, notably commercially available as IRGANOX® 245 antioxidant.

It maybe appropriate, in certain cases, to incorporate in the composition (C) one or more additives selected from plasticizers and processing aids.

When present, the combined amount of plasticizer(s) and processing aid(s) would not exceed 10 weight parts, preferably 7.5 weight parts, more preferably 5 weight parts, per 100 weight parts of combined PVDF+VDF copolymer.

Among plasticizers, one which has shown itself to be particularly advantageous within the context of the present invention is DBS (dibutyl sebacate: $C_4H_9$—COO—$(CH_2)_8$—COO—$C_4H_9$). Other effective plasticizers are polymeric polyesters such as those derived from adipic, azelaic or sebacic acids and diols, and their mixtures, but on condition that their molecular mass is at least approximately 1500, preferably at least 1800, and not exceeding approximately 5000, preferably lower than 2500. Polyesters of excessively high molecular mass result, in fact, in compositions of lower impact strength, and are hence not preferred.

The DBS or the abovementioned polyesters are incorporated without any difficulty in the mixtures of PVDF and VDF copolymer defined above, and have been found to improve processability without impairing or even improving impact strength.

The amount of plasticizer is not particularly limited. It is nevertheless understood that an amount of plasticizer, as above detailed, ranging from 0.5 to 5, preferably from 1 to 3 weight parts per 100 weight parts of combined PVDF and VDF copolymer is preferred.

A processing aid which has been found particularly useful is a combination of:

(1) at least one tetrafluoroethylene (TFE)/perfluoroalkyl vinyl ether copolymer [polymer (F)], preferably a TFE/perfluoromethyl vinyl ether copolymer, having a dynamic viscosity at a shear rate of 1 rad×sec$^{-1}$ of less than 100 Pa×sec, at a temperature of 280° C. (determined according to ASTM D 4440 standard, following equations listed in Practice ASTM D 4065 to determine "Complex viscosity, eta*" at 1 rad×sec$^{-1}$); and (2) at least one perfluoropolyether additive, in particular a perfluoropolyether additive possessing a perfluoropolyether chain and including hydroxyl functional group, e.g. perfluoropolyether additives complying with any of formulae:

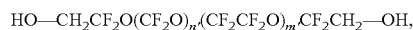

HO—$CH_2CF_2O(CF_2O)_n(CF_2CF_2O)_mCF_2CH_2$—OH, m' and n' being integers, where the ratio m'/n' generally ranges between 0.1 and 10, preferably between 0.2 and 5;

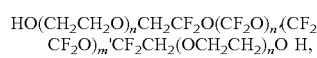

HO$(CH_2CH_2O)_nCH_2CF_2O(CF_2O)_n(CF_2CF_2O)_m$'$CF_2CH_2(OCH_2CH_2)_nO$ H, m' and n' being integers, where the ratio m'/n' generally ranges between 0.1 and 10, preferably between 0.2 and 5, and n ranges between 1 and 3.

The amount of this combination of processing aids is not particularly limited. It is nevertheless understood that an amount of perfluoropolyether additive of at least 0.05, preferably at least 0.1 weight parts, and at most 0.5, preferably at most 0.4 weight parts per 100 weight parts of combined PVDF and VDF copolymer is preferred. Similarly, an amount of polymer (F), as above detailed ranging from 0.5 to 5, preferably from 1 to 3 weight parts per 100 weight parts of combined PVDF and VDF copolymer is preferred.

Nevertheless, embodiments wherein the composition (C) does not comprise said combination of processing aid have been found to be particularly advantageous.

A preferred embodiment of the composition (C) according to the invention is a composition consisting of:
- from 60 to 65% wt of PVDF, as above detailed,
- from 40 to 35% wt of VDF copolymer, as above detailed, with respect to the total weight of PVDF and VDF copolymer,
- from 0.1 to 1 weight parts of polymer (PE)
- from 0.01 to 0.5 weight parts of calcium carbonate;
- from 0.01 to 1 weight parts of an antioxidant selected from the group consisting of tetrakis[methylene-3-(3,5-di-tert-butyl-4-hydroxyphenyl)propionate]methane, octadecyl-3,5-Di(tert)-butyl-4-hydroxyhydrocinnmate, N,N'-hexane-1,6-diylbis(3-(3,5-di-tert-butyl-4-hydroxyphenylpropionamide)), and triethylene glycol bis(3-tert-butyl-4-hydroxy-5-methylphenyl)propionate;
- said weight parts being referred to 100 weight parts of combined PVDF and VDF copolymer.

The Mobile Electronic Device

In another aspect, the invention provides for a mobile electronic device comprising at least one part made of a fluoropolymer composition [composition (C)], as above detailed.

The term "mobile electronic device" is intended to denote any electronic devices that are designed to be conveniently transported and used in various locations while exchanging/providing access to data, e.g. through wireless connections or mobile network connection. Representative examples of mobile electronic devices include mobile phones, personal digital assistants, laptop computers, tablet computers, radios, cameras and camera accessories, watches, calculators, music players, global positioning system receivers, portable games, hard drives and other electronic storage devices, and the like. Preferably the mobile electronic device is a mobile phone (e.g. a smart-phone), a laptop computer, or a tablet computer.

The at least one part of the mobile electronic device according to the present invention may be selected from a large list of articles such as fitting parts, snap fit parts, mutually moveable parts, functional elements, operating elements, tracking elements, adjustment elements, carrier elements, frame elements, switches, connectors and (internal and external) components of housing, which can be notably produced by injection molding, extrusion or other shaping technologies.

In particular, the polymer composition (C) is very well suited for the production of housing components of mobile electronic device.

Therefore, the at least one part of the mobile electronic device according to the present invention is advantageously a component of a mobile electronic device housing. By "mobile electronic device housing" is meant one or more of the back cover, front cover, antenna housing, frame and/or backbone of a mobile electronic device. The housing may be a single component-article or, more often, may comprise two or more components. By "backbone" is meant a structural component onto which other components of the device, such as electronics, microprocessors, screens, keyboards and keypads, antennas, battery sockets, and the like are mounted. The backbone may be an interior component that is not visible or only partially visible from the exterior of the mobile electronic device. The housing may provide protection for internal components of the device from impact and contamination and/or damage from environmental agents (such as liquids, dust, and the like). Housing components such as covers may also provide substantial or primary structural support for and protection against impact of certain components having exposure to the exterior of the device such as screens and/or antennas. Housing components may also be designed for their aesthetic appearance and touch.

In a preferred embodiment, the mobile electronic device housing is selected from the group consisting of a mobile phone housing, a tablet housing, a laptop computer housing and a tablet computer housing. Excellent results were obtained when the part of the mobile electronic device according to the present invention was a mobile phone housing.

The at least one part of the mobile electronic device according to the present invention is advantageously characterized by a thickness of a flat portion of said part being 0.9 mm or less, preferably 0.8 mm or less, more preferably 0.7 mm or less, still more preferably 0.6 mm or less and most preferably 0.5 mm or less on average. The term "on average" is herein intended to denote the average thickness of the part based on the measurement of its thickness on at least 3 points of at least one of its flat portions.

The Method for Manufacturing the Part

A further object of the present invention is a method for manufacturing a part of a mobile electronic device, as above detailed, said method comprising:

(i) providing a composition (C), as above detailed,
(ii) moulding said composition (C) so as to provide said part.

The step (i) of providing a composition (C) generally includes at least one step of mixing PVDF, VDF copolymer, polymer (PE) and possibly additional additives. Mixing can be effected using standard mixing devices; generally PVDF, VDF copolymer, polymer (PE) and additive(s) (when present) are mixed in the molten form. Mixing is generally accomplished using extruder devices, with twin-screw extruders being preferred.

It is hence common practice of providing the composition (C) in step (i) under the form of pellets.

The composition (C) is moulded in step (ii) to provide said part. Technique used for moulding is not particularly limited; standard techniques including shaping composition (C) in a molten/softened form can be advantageously applied, and include notably compression moulding, extrusion moulding, injection moulding, transfer moulding and the like.

It is nevertheless generally understood that especially when said part of the mobile electronic device possesses a complex design, injection moulding technique is the most versatile, and extensively used.

According to this technique, a ram or screw-type plunger is used for forcing a portion of composition (C) in its molten state into a mould cavity, wherein the same solidified into a shape that has confirmed to the contour of the mould. Then, the mould opens and suitable means (e.g. an array of pins, sleeves, strippers, etc.) are driven forward to demould the article. Then, the mould closes and the process is repeated.

In another embodiment of the present invention, the method for manufacturing a part of a mobile electronic device includes in step (ii) a step of machining of a standard shaped article so as to obtain said part having different size and shape from said standard shaped article. Non limiting examples of said standard shaped articles include notably a plate, a rod, a slab and the like. Said standard shaped parts can be obtained by any processing technique, including notably extrusion or injection moulding of the polymer composition (C).

The parts of the mobile electronic devices according to the present invention may be coated with metal by any known methods for accomplishing that, such as vacuum deposition (including various methods of heating the metal to be deposited), electroless plating, electroplating, chemical vapor deposition, metal sputtering, and electron beam deposition. Hence, the method, as above detailed, may additionally comprise at least one additional step comprising coating at least one metal onto at least a part of the surface of the said part.

Although the metal may adhere well to the parts without any special treatment, usually some well known in the art method for improving adhesion will be used. This may range from simple abrasion of the surface to roughen it, addition of adhesion promotion agents, chemical etching, functionalization of the surface by exposure to plasma and/or radiation (for instance laser or UV radiation) or any combination of these.

Also, the metal coating methods may comprise at least one step where the part is immersed in an acid bath. More than one metal or metal alloy may be plated onto the parts made of the polymer composition (C), for example one metal or alloy may be plated directly onto the surface because of its good adhesion, and another metal or alloy may be plated on top of that because it has a higher strength and/or stiffness. Useful metals and alloys to form the metal coating include copper, nickel, iron-nickel, cobalt, cobalt-nickel, and chromium, and combinations of these in different layers. Preferred metals and alloys are copper, nickel, and iron-nickel, and nickel is more preferred. The surface of the part may be fully or partly coated with metal. In different areas of the part the thickness and/or the number of metal layers, and/or the composition of the metal layers may vary. The metal may be coated in patterns to efficiently improve one or more properties in certain sections of the part.

The part, as obtained from the method above, is generally assembled with other components in order to manufacture a mobile electronic device.

The Method for the Manufacture of the Mobile Electronic Device

Still another object of the invention is a method for the manufacture of a mobile electronic device, said method including the steps of:

a. providing as components at least a circuit board, a screen and a battery;

b. providing at least one part made of the polymer composition (C), as above detailed;

c. assembling at least one of said components with said part or mounting at least one of said components on said part.

Other Fields of Use

The composition according to the present invention may also find utility in a variety of other fields of use, wherein its advantageous set of properties maybe beneficial for delivering outstanding benefits.

In particular, the composition of the present invention may find utility in the Oil&Gas market, notably for the manufacture of parts used for oil extraction and/or transportation.

Should the disclosure of any patents, patent applications, and publications which are incorporated herein by reference conflict with the description of the present application to the extent that it may render a term unclear, the present description shall take precedence.

The invention will now be described with reference to the following examples, whose purpose is merely illustrative and not intended to limit the scope of the invention.

Raw Materials

SOLEF® 6008 PVDF is a PVDF homopolymer having a melt flow rate (at 230° C./5 kg, ASTM D1238) of about 24 g/10 min, and an inherent viscosity of about 0.8 dl/g (in N,N-dimethylformamide 4.0 g/l with 0.1 M LiBr at 25° C.), commercially available from Solvay Specialty Polymers.

SOLEF® 6010 PVDF is a PVDF homopolymer having a melt flow rate (at 230° C./5 kg, ASTM D1238) of about 6 g/10 min, and an inherent viscosity of about 1.0 dl/g (in N,N-dimethylformamide 4.0 g/l with 0.1 M LiBr at 25° C.), commercially available from Solvay Specialty Polymers.

SOLEF® 6015 PVDF is a PVDF homopolymer having a melt flow rate (at 230° C./21.6 kg, ASTM D1238) of about 3.8 g/10 min, a melt flow rate (at 230° C./5 kg, ASTM D1238) of about 0.2 g/10 min, and an inherent viscosity of about 1.9 dl/g (in N,N-dimethylformamide 4.0 g/l with 0.1 M LiBr at 25° C.), commercially available from Solvay Specialty Polymers.

SOLEF® 21508 VDF copolymer is a low-viscosity VDF copolymer having a melt flow rate (at 230° C./2.16 kg, ASTM D1238) of about 7 g/10 min, and an inherent viscosity of about 0.8 dl/g (in N,N-dimethylformamide 4.0 g/l with 0.1 M LiBr at 25° C.), commercially available from Solvay Specialty Polymers SOLEF® 11615 VDF copolymer is a high viscosity VDF/HFP heterogeneous copolymer having a melt flow rate (at 230° C./21.6 kg, ASTM D1238) of about 3.3 g/10 min, and an inherent viscosity of about 2.0 dl/g (in N,N-dimethylformamide 4.0 g/l with 0.1 M LiBr at 25° C.), and a melting point (ASTM D3418) of 158-162° C., produced by Solvay Specialty Polymers.

SOLEF® 11608 VDF copolymer is a VDF/HFP heterogeneous copolymer having a melt flow rate (at 230° C./2.16 kg, ASTM D1238) of about 3.3 g/10 min, and an inherent viscosity of about 0.1 dl/g (in N,N-dimethylformamide 2.0 g/l with 0.1 M LiBr at 25° C.), and a melting point (ASTM D3418) of about 151° C., produced by Solvay Specialty Polymers.

SONGNOX® 1010 antioxidant is neat tetrakis[methylene-3-(3,5-di-tert-butyl-4-hydroxyphenyl)propionate]methane, commercially available from Songwon.

SOCAL® 312 PCC is an ultrafine coated precipitated calcium carbonate commercially available from Solvay.

ELTEX® HDPE A4090P is a polyethylene having a density of 951 Kg/m$^3$ (at 23° C./according to ISO1183/A) and a melt index of 11 g/10 min (190° C./2.16 kg) commercially available from INEOS.

Ex. 1C and Ex. 2C—Comparative Tests with a PVDF and a VDF Copolymer as Reference Materials Tensile properties and Impact resistance were determined on compression molded specimens.

TABLE 1

| Test ID | Ex. 1C SOLEF® 21508 VDF/HFP copolymer | Ex. 2C SOLEF® 6008 PVDF |
|---|---|---|
| tensile strength at yield (MPa) | 19 | 55 |
| tensile strength at break (MPa) | 20 | 31 |
| Tensile Modulus (Gpa) | 0.5 | 2.2 |
| % elongation at break | 338 | 28 |
| Impact - notched IZOD (J/m) | 854 | 98 |

Data collected in table 1 demonstrate that a VDF/HFP copolymer, when used alone, cannot be used as suitable plastic for the manufacture of parts for mobile electronic devices, notably because it fails to possess adequate tensile strength and modulus: in other terms, it is notably not stiff enough for being used for manufacturing structural parts. On the other side, PVDF homopolymers are not suitable either, as they do not have sufficient impact resistance: in other terms, these polymers are too brittle for being used for the manufacture of mobile electronic devices parts, which shall withstand occasional drops.

Ex. 3—Manufacture of a Homopolymer/Copolymer Composition

A composition has been prepared in the form of pellets by melt extrusion combining a mixture of 60% wt of SOLEF® 6010 PVDF homopolymer; 40% wt of SOLEF® 11615 VDF/HFP copolymer, further combined with 0.2 weight parts of ELTEX® HDPE additive, 0.02 weight parts of SOCAL® PCC and 0.1 weight parts of SONGNOX® 1010 per 100 parts of combined PVDF and VDF copolymer.

Ex. 4—Manufacture of a Homopolymer/Copolymer Composition

A composition has been prepared in the form of pellets by melt extrusion combining a mixture of 60% wt of SOLEF® 6008 PVDF homopolymer; 40% wt of SOLEF® 11615 VDF/HFP copolymer, further combined with 0.2 weight parts of ELTEX® HDPE additive, 0.02 weight parts of SOCAL® PCC and 0.1 weight parts of SONGNOX® 1010 per 100 parts of combined PVDF and VDF copolymer.

Comparative Ex. 5C—Manufacture of a Homopolymer/Copolymer Composition with Copolymer Having Lower Molecular Weight Than Homopolymer A composition has been prepared in the form of pellets by melt extrusion combining a mixture of 60% wt of SOLEF® 6015 PVDF homopolymer; 40% wt of SOLEF® 11608 VDF/HFP copolymer, further combined with 0.2 weight parts of ELTEX® HDPE additive, 0.02 weight parts of SOCAL® PCC and 0.1 weight parts of SONGNOX® 1010 per 100 parts of combined PVDF and VDF copolymer.

General Procedure for Injection Moulding of Parts

Pellets as obtained in Ex. 3, 4 and 5C were fed to an Engel E-Motion 200/100 injection molding device for the manufacture of injected parts having ASTM tensile bar shape, according to ASTM D790. The injection molding device used is equipped with a screw extruder barrel and a mould with clamping force up to 1000 kN, and melt pressure controller up to 2500 bar.

Injection molding conditions were such that melt temperature was about 190-210° C. in Ex. 2C and of 210 to 230° C. in Ex. 3, and mold temperature was set to 90° C.

Injection molding conditions are summarized in Table below.

TABLE 2

| Material/run | Ex. 2C | Ex. 3 |
|---|---|---|
| Injection molding conditions | | |
| weight full part (g) | 48.5 | 48.8 |
| measured matrix temperature (° C.) | 89 | 90 |
| Injection Pressure Peak (Bar) | 547-580 | 1041-1084 |
| Injection time (s) | 2.86 | 2.98 |

As demonstrated above, injection molded parts can be obtained from compositions of Ex. 3, within a range of processing conditions which are customary for standard equipment's, including reasonable injection pressures.

The aspect surface of injected parts obtained from composition of Ex. 3 was good and smooth; the part was opaque and white, and was found to be easily coloured by addition of appropriate pigments.

Properties of Injection Molded Specimens—Mechanical Properties

Injection molded specimens were tested for their tensile strength (according to ASTM D638), and for their impact resistance (according to Notched IZOD technique, pursuant to ISO 180/1A at 23° C. Results are summarized in Table herein below.

TABLE 3

| Material/run | Ex. 2C | Ex. 3 | Ex. 4 | Ex. 5C |
|---|---|---|---|---|
| Tensile Properties on injection molded specimens (DAM)-ISO527-4 | | | | |
| STRENGTH AT BREAK (MPa) | 31.1 | 27.7 | 28.5 | 25.1 |
| % STRAIN AT BREAK (%) | 28.6 | 52.0 | 58.6 | 29.0 |
| STRESS AT YIELD (Mpa) | 53.4 | 34.9 | 35.3 | 34.1 |
| % STRAIN AT YIELD (%) | 8.0 | 17.4 | 10.0 | 18.1 |
| MODULUS - (ISO-segment) (GPa) | 2.0 | 1.0 | 1.1 | 1.0 |

TABLE 3-continued

| Material/run | Ex. 2C | Ex. 3 | Ex. 4 | Ex. 5C |
|---|---|---|---|---|
| Impact resistance properties on injection molded specimens (DAM) - ISO 180/1A | | | | |
| Notched IZOD NE (kJ/m$^2$) | n.d. | 176.2 (NB) | 179.8 (NB) | 174.9 (NB) |
| Notched IZOD E (kJ/m$^2$) - (ISO 180/1A) | 9.1 | 100.8 | 84.3 | 89.2 |

DAM: dry as molded.;
NB = "No Break"

Properties of injection molded specimens confirms that the compositions comprising mixtures of homopolymer and copolymer and HDPE possess the advantageous properties' requirements (tensile strength, strain/elongation at break, impact resistance) which are needed for being used for fabricating parts of mobile electronic devices.

As shown in the above table, when using a copolymer having lower molecular weight than the homopolymer, the resulting strain at break is unacceptable, and is substantially similar to the performances exhibited by a mere homopolymer.

Further, in addition, injection molded specimen's exhibit outstanding chemical resistance and stain resistance, thanks to the fluorine-related properties.

Ex. 6—Manufacture of a Homopolymer/Copolymer Composition

A composition has been prepared in the form of pellets by melt extrusion combining a mixture of 60% wt of SOLEF® 6015 PVDF homopolymer; 40% wt of SOLEF® 11615 VDF/HFP copolymer, further combined with 2 parts of dibutyl sebacate plasticizer and 0.5 weight parts of ELTEX® HDPE additive per 100 parts of combined PVDF and VDF copolymer.

Ex. 7C—Manufacture of a Homopolymer/Copolymer Composition

A composition has been prepared in the form of pellets by melt extrusion combining a mixture of 60% wt of SOLEF® 6015 PVDF homopolymer; 40% wt of SOLEF® 11615 VDF/HFP copolymer, further combined with 2 parts of dibutyl sebacate plasticizer with no addition of ELTEX® HDPE additive.

Processability in Tape Extrusions at Thickness of 6 mm

Compositions of Ex. 6 and Ex. 7C were extruded in a tape extrusion machine, with temperature set points in the extruder of 190 to 215° C., at a drawing speed of 0.2 m/min, speed rate of 8 rpm and rolls temperature of 70° C. In case of Ex. 6, pressure was measured to be 17 bar, with a torque of 18-20 Nm, for an output of 1.3 Kg/h; providing tapes with good surface aspect. In case of Ex. 7C, pressure was measured to be 24 bar, with a torque of 28 Nm, for an output of 1.0 Kg/h; providing tapes with certain defects on the surface (slight sharkskin). Charpy impact test on specimens of 6 mm thick tapes for Ex. 6 and Ex. 7C provided at 23° C. values of 106.6 kJ/m$^2$ for Ex. 6 and 103.9 kJ/m$^2$ for Ex. 7C, and at 0° C. values of 91.4 kJ/m$^2$ for Ex. 6 and 88.0 kJ/m$^2$ for Ex. 7C.

These data clearly demonstrate that when mixing VDF homopolymer with higher molecular weight VDF copolymer, the addition of the polymer (PE) is beneficial both for mechanical performances and for processability, even in combination with other well-known processing aids/plasticizers.

The invention claimed is:

1. A fluoropolymer composition (C), said composition (C) comprising:
    at least one vinylidene fluoride (VDF) homopolymer [PVDF] in an amount of from 55 to 85% wt, said PVDF possessing a first molecular weight (MPVDF);
    at least one VDF semi-crystalline copolymer comprising recurring units derived from VDF and recurring units derived from HFP [VDF copolymer] in an amount of from 15 to 45% wt, said VDF copolymer possessing a second molecular weight (MVDF copolymer) such that MVDF copolymer is higher than MPVDF;
    the % wt being with respect to the sum of weights of PVDF and VDF copolymer, and
    at least one high density ethylene polymer (PE), comprising more than 70% weight of recurring units derived from ethylene, and optionally comprising recurring units derived from at least one alpha-olefin different from ethylene, said polymer (PE) possessing a density of from 930 to 970 kg/m$^3$, said polymer (PE) being comprised in an amount of at least 0.05 weight parts and at most 5 weight parts, per 100 weight parts of combined amount of PVDF and VDF copolymer.

2. The composition (C) according to claim 1, wherein the PVDF possesses a melt flow rate (230° C./5 kg, according to ASTM D 1238) of at least 5 g/10 min, and/or of at most 50 g/10 min.

3. The composition (C) according to claim 2, wherein the PVDF possesses a melt flow rate (230° C./5 kg, according to ASTM D 1238) of at least 5 g/10 min, and at most 15 g/10 min.

4. The composition (C) according to claim 1, wherein the PVDF possesses an inherent viscosity ($\eta$i PVDF), measured at 4.0 g/l in N,N-dimethylformamide stabilized with 0.1M LiBr at a temperature of 25° C., of less than 1.5 dl/g and/or of at least 0.5 dl/g.

5. The composition (C) according to claim 4, wherein the PVDF possesses an inherent viscosity ($\eta$i PVDF), measured at 4.0 g/l in N,N-dimethylformamide stabilized with 0.1M LiBr at a temperature of 25° C., of less than 1.2 dl/g and at least 0.8 dl/g.

6. The composition according to claim 1, wherein the VDF copolymer possesses a heat of fusion of at least 5 J/g.

7. The composition according to claim 6, wherein the VDF copolymer possesses a heat of fusion of at least 15 J/g.

8. The composition according to claim 1, wherein the VDF copolymer is a polymer comprising:
    (a') at least 75% by moles of recurring units derived from vinylidene fluoride (VDF);
    (b') from 1 to 25% by moles of recurring units derived from HFP; and
    (c') optionally from 0.1 to 5% by moles of recurring units derived from one or more additional comonomer(s) different from VDF and HFP,
    all the aforementioned % by moles being with respect to the total moles of recurring units of the VDF copolymer.

9. The composition according to claim 1, wherein the VDF copolymer is a polymer consisting essentially of:
    (a') at least 75% by moles of recurring units derived from vinylidene fluoride (VDF);
    (b') from 1 to 25% by moles of recurring units derived from hexafluoropropene (HFP),
    all the aforementioned % by moles being with respect to the total moles of recurring units of the VDF copolymer.

10. The composition according to claim 1, wherein the VDF copolymer has a melting point (Tm2) of at least 120° C. and of at most 180° C., when determined by DSC, at a heating rate of 10° C./min, according to ASTM D 3418.

11. The composition according to claim 10, wherein the VDF copolymer has a melting point (Tm2) of at least 130° C. and at most 170° C., when determined by DSC, at a heating rate of 10° C./min, according to ASTM D 3418.

12. The composition according to claim 1, wherein the VDF copolymer possesses a melt flow rate (at 230° C./21.6 kg, ASTM D1238) of about 0.1 to 20 g/10 min.

13. The composition according to claim 12, wherein the VDF copolymer possesses a melt flow rate (at 230° C./21.6 kg, ASTM D1238) of about 0.5 to 10 g/10 min.

14. The composition according to claim 1, wherein the VDF copolymer possesses an inherent viscosity ($\eta$i VDF copolymer), measured at 4.0 g/l in N,N-dimethylformamide stabilized with 0.1M LiBr at a temperature of 25° C., of at least 1.2 dl/g and/or wherein upper limit for $\eta$i VDF copolymer is of at most 3.5 dl/g.

15. The composition according to claim 14, wherein the VDF copolymer possesses an inherent viscosity ($\eta$i VDF copolymer), measured at 4.0 g/l in N,N-dimethylformamide stabilized with 0.1M LiBr at a temperature of 25° C., of at least 1.5 dl/g and at most 2.5 dl/g.

16. The composition according to claim 1, said composition consisting of:
    from 60 to 65% wt of PVDF,
    from 40 to 35% wt of VDF copolymer,
    with respect to the total weight of PVDF and VDF copolymer,
    from 0.1 to 1 weight parts of polymer (PE);
    from 0.01 to 0.5 weight parts of calcium carbonate;
    from 0.01 to 1 weight parts of an antioxidant selected from the group consisting of tetrakis[methylene-3-(3,5-di-tert-butyl-4-hydroxyphenyl)propionate] methane, octadecyl-3,5-Di(tert)-butyl-4-hydroxyhydrocinnmate, N,N'-hexane-1,6-diylbis(3-(3,5-di-tert-butyl-4-hydroxyphenylpropionamide)), and triethylene glycol bis (3-tert-butyl-4-hydroxy-5-methylphenyl)propionate;
    said weight parts being with respect to 100 weight parts of combined PVDF and VDF copolymer.

17. A mobile electronic device comprising at least one part made of a fluoropolymer composition (C) according to claim 1.

18. The mobile electronic device of claim 17, wherein said at least one part is a component of a mobile electronic device housing selected from the group consisting of a mobile phone housing, a tablet housing, a laptop computer housing and a tablet computer housing.

19. A method for manufacturing a part of a mobile electronic device, said method comprising:
    (i) providing a composition (C) according to claim 1; and
    (ii) moulding said composition (C) so as to provide said part.

20. A method for the manufacture of a mobile electronic device, said method comprising:
    assembling at least one component selected from a circuit board, a screen and a battery with
    at least one part made of the polymer composition (C) according to claim 1,
    or mounting at least one of said components on said part.

* * * * *